UNITED STATES PATENT OFFICE.

JOHN A. JUST, OF SYRACUSE, NEW YORK.

PROCESS OF PREPARING CASEIN SOLUBLE TO A NEUTRAL SOLUTION.

No. 868,445.  Specification of Letters Patent.  Patented Oct. 15, 1907.

Application filed November 21, 1906. Serial No. 344,356.

*To all whom it may concern:*

Be it known that I, JOHN A. JUST, a citizen of the United States, and resident of Syracuse, New York, have invented certain new and useful Improvements in Process of Preparing Casein Soluble to a Neutral Solution, of which the following is a specification.

The invention relates to a process for preparing milk casein for commercial purposes readily soluble to a neutral solution.

Separated milk is preferably diluted with two to four times its volume of water and most intimately mixed therewith. The mixture is gently heated to about 90 to 100 degrees F., and acetic acid is slowly added in about the ratio of 1/10 percent sufficient to precipitate casein slowly. The acid is intimately mixed with the diluted milk and the heat raised gently until the complete separation of casein has taken place. The temperature should not exceed 140 degrees F. The mass is allowed to rest and after a short time a dense sheet of casein is formed on the bottom of the vat.

The dense solid sheet of casein thus formed may be washed and well drained to free it from adhering whey, etc. and then is removed and broken up into small pieces by hand or by passing through a suitable mill, and mixed with a suitable quantity of alkali or alkaline salt to form a neutral porous paste or solution and dried to form a neutral casein. The drying may be accomplished in any suitable way. The curd may be dried in its simple state, and the requisite alkali then added to it in the dry powdered state, or an alkaline salt, as for instance, sodium carbonate, sodium borate, sodium phosphate, or an alkaline earth may be used dry and added to the casein in sufficient quantity to form a neutral solution when dissolved. The quantity of alkali necessary for this is ascertained by a trial test and a large quantity then treated accordingly. The required amount of alkali and casein may then be ground together or intimately mixed. Upon the addition of water the casein will be dissolved to a pasty mass ready to be used for any suitable purpose. It may be compounded with coloring matter and mineral substances in powdered form, thus forming the binding agent of cold water paint, or used in any of the many ways commercial casein is applied in the arts.

Casein made in this way is soluble to neutral solution in alkali and does not require an excess of alkali for solution, as is the case with prior articles; and the exact amount of alkali chemically required can be used, forming a neutral solution of casein, which is only possible by treating the casein as described. In all other cases heretofore the alkali must be used in large excess which is detrimental in its uses in the arts.

Casein thus made and treated I find dissolves to a neutral solution without an excess of alkali, which is the object of this invention. It is important in the arts that commercial casein should have this property, since it is required to broaden its field of application. Mixed with colors that are sensitive to alkalinity, as for instance, in the paper industry where casein is largely used as a sizing instead of glue, it is superior and cheaper and in coating paper. Casein thus produced contains only a small amount of ash. Casein precipitated by alcohol as it is usually prepared in the laboratory contains on an average 7.36 percent of ash.

Casein prepared according to the above method for commercial uses contains only 1.78 percent of ash. Commercial casein thus prepared becomes useful for numerous purposes in the arts where it cannot be employed at the present time.

I claim and desire to obtain by Letters Patent the following:—

1. The process substantially as herein described of preparing milk casein soluble to a neutral solution, which consists in treating separated milk with a small proportion of acetic acid, sufficient to precipitate casein slowly heating the mixture, recovering the casein so precipitated, mixing the casein with a sufficient quantity of alkali or alkaline salt to form a neutral soluble compound, and drying the mixture to form a neutral casein suitable for commercial purposes.

2. The process substantially as herein described of preparing milk casein soluble to a neutral solution, which consists in mixing separated milk with only sufficient acetic acid to precipitate casein slowly, warming the mixture, allowing the casein to settle, recovering the casein and mixing the casein with a sufficient quantity of alkali or alkaline salt to form a neutral soluble compound.

3. The process substantially as herein described of preparing milk casein soluble to a neutral solution, which consists in diluting the separated milk, mixing the diluted milk with only sufficient acetic acid to precipitate casein slowly, gently heating the mixture to about 90 to 100 degrees F., to hasten precipitation and recovering the casein formed, mixing the casein with a sufficient quantity of alkali or alkaline salt to form a neutral soluble compound and drying the mixture to form a neutral casein suitable for commercial purposes.

4. The process substantially as herein described of preparing milk casein soluble to a neutral solution, which consists in treating separated milk with about one-tenth percent of acetic acid, heating the mixture to not exceed 140 degrees F., recovering the casein so formed, washing and drying the casein and adding a sufficient quantity of dry alkali or alkaline salt to form a neutral soluble compound.

5. In the process of preparing milk casein adapted to be dissolved to a neutral solution, the process which consists in treating separated milk with about one-tenth percent of acetic acid, heating the mixture not to exceed 140 degrees F, recovering the casein so formed, and washing and draining the casein.

6. In the process of preparing milk casein adapted to be dissolved to a neutral solution, the process which consists in diluting the separated milk from two to four times its volume, adding about one-tenth percent of acetic acid and thoroughly mixing, warming and allowing the separated casein to settle, separating the liquid, washing the casein from adhering liquid, removing the casein thus produced and draining it.

7. In the process of preparing milk casein adapted to be dissolved to a neutral solution, the process which consists in diluting the separated milk from two to four times its volume, adding about one-tenth percent of acetic acid and thoroughly mixing, heating the mixture to not exceed 140 degrees F, and allowing the separated casein to settle, separating the liquid, washing the casein from adhering liquid, removing the casein thus produced and draining it.

In testimony whereof I have signed this specification in the presence of two subscribing witnesses.

JOHN A. JUST.

Witnesses:
   OLIN A. FOSTER,
   A. K. SCHNEIDER.